(12) United States Patent
Nishiyama

(10) Patent No.: US 10,204,740 B2
(45) Date of Patent: Feb. 12, 2019

(54) CAPACITOR CIRCUIT, CAPACITOR MODULE, AND POWER CONVERSION SYSTEM

(71) Applicant: Murata Manufacturing Co., Ltd., Nagaokakyo-shi, Kyoto-fu (JP)

(72) Inventor: Shigeki Nishiyama, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 156 days.

(21) Appl. No.: 15/498,533

(22) Filed: Apr. 27, 2017

(65) Prior Publication Data

US 2017/0229246 A1    Aug. 10, 2017

Related U.S. Application Data

(63) Continuation of application No. PCT/JP2015/079482, filed on Oct. 19, 2015.

(30) Foreign Application Priority Data

Dec. 22, 2014    (JP) .................................. 2014-258484

(51) Int. Cl.
*H01G 4/38*    (2006.01)
*H01G 4/12*    (2006.01)
(Continued)

(52) U.S. Cl.
CPC .............. *H01G 4/38* (2013.01); *H01G 4/005* (2013.01); *H01G 4/12* (2013.01); *H01G 4/248* (2013.01); *H01G 4/33* (2013.01); *H01G 4/40* (2013.01); *H02M 1/32* (2013.01); *H02M 5/458* (2013.01); *H02M 7/04* (2013.01); *H02M 7/44* (2013.01); *H02M 2001/325* (2013.01)

(58) Field of Classification Search
CPC .......... H01G 4/005; H01G 4/248; H01G 4/33; H01G 4/40; H01G 4/38; H01G 4/12; H02M 1/32; H02M 5/458; H02M 2001/325; H02M 7/04; H02M 7/44
See application file for complete search history.

(56) References Cited

U.S. PATENT DOCUMENTS

| 5,570,260 A | 10/1996 | Kanai et al. |
| 9,378,892 B2 | 6/2016 | Engel et al. |
| 2013/0026852 A1 | 1/2013 | Engel et al. |

FOREIGN PATENT DOCUMENTS

| JP | S54-63353 A | 5/1979 |
| JP | H03-240213 A | 10/1991 |

(Continued)

OTHER PUBLICATIONS

International Search Report issued in International Patent Application No. PCT/JP2015/079482, dated Jan. 12, 2016.

(Continued)

*Primary Examiner* — Robert Deberadinis
(74) *Attorney, Agent, or Firm* — Arent Fox LLP

(57) ABSTRACT

A capacitor circuit includes two ceramic capacitors that are connected in series. The two ceramic capacitors each have a ferroelectric layer interposed between conductive layers and have substantially identical direct-current bias characteristics such that an electrostatic capacitance during application of a voltage, which is half of a rated voltage, is larger than the electrostatic capacitance during application of the rated voltage higher than the voltage.

20 Claims, 8 Drawing Sheets

(51) Int. Cl.
*H02M 1/32* (2007.01)
*H01G 4/005* (2006.01)
*H01G 4/248* (2006.01)
*H01G 4/33* (2006.01)
*H01G 4/40* (2006.01)
H01G 7/00 (2006.01)
H02M 5/458 (2006.01)
H02M 7/04 (2006.01)
H02M 7/44 (2006.01)

(56) References Cited

FOREIGN PATENT DOCUMENTS

| | | |
|---|---|---|
| JP | H06-311727 A | 11/1994 |
| JP | 2004-22561 A | 1/2004 |
| JP | 2010-16959 A | 1/2010 |
| JP | 2013-518400 A | 5/2013 |
| JP | 2013-252009 A | 12/2013 |

OTHER PUBLICATIONS

Written Opinion in the International Search Authority issued in International Patent Application No. PCT/JP2015/079482, dated Jan. 12, 2016.

FIG. 2
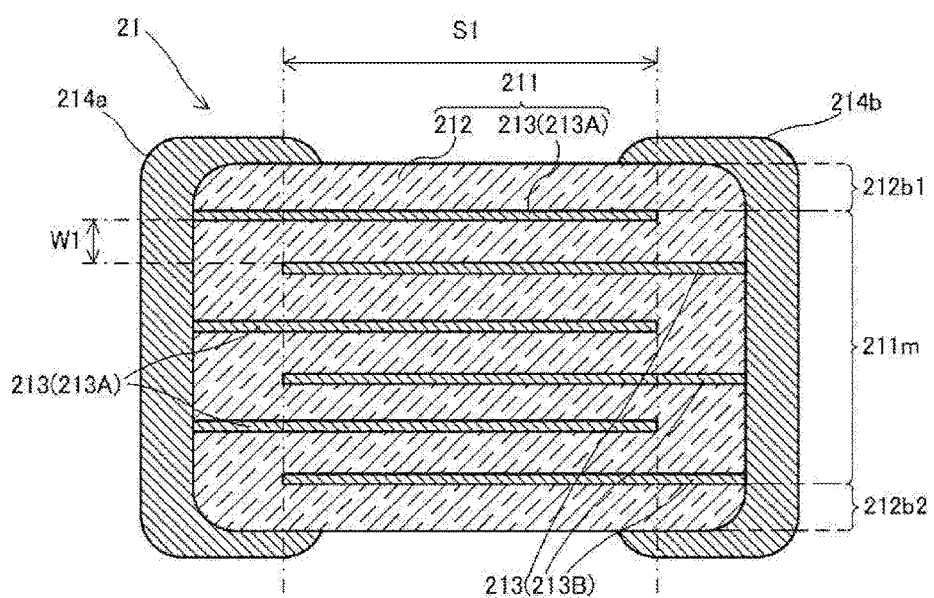
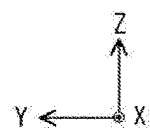

FIG. 4(a) During a normal state
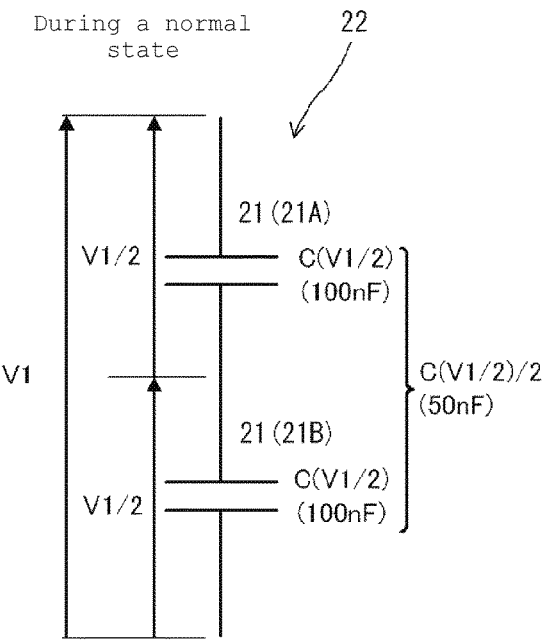
FIG. 4(b) In case of fault
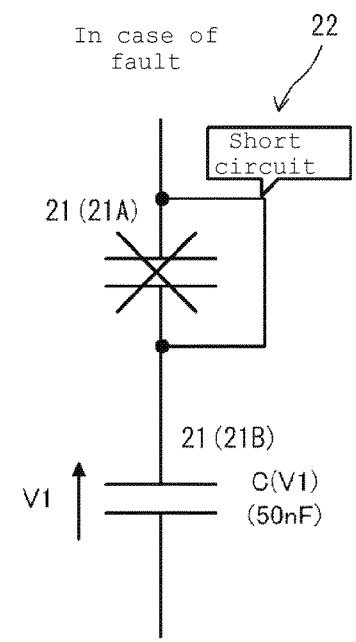

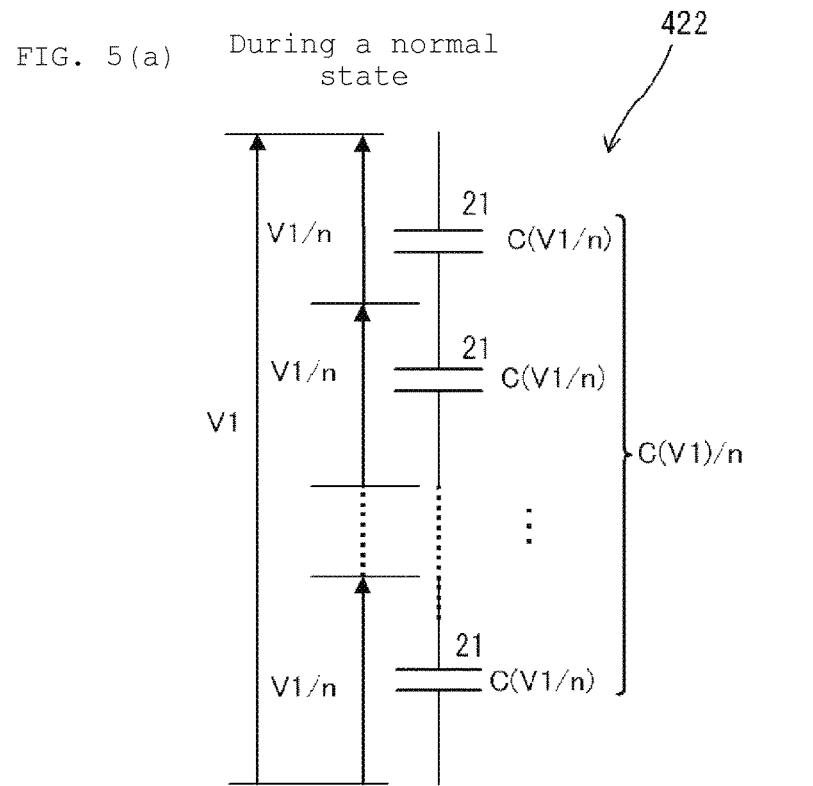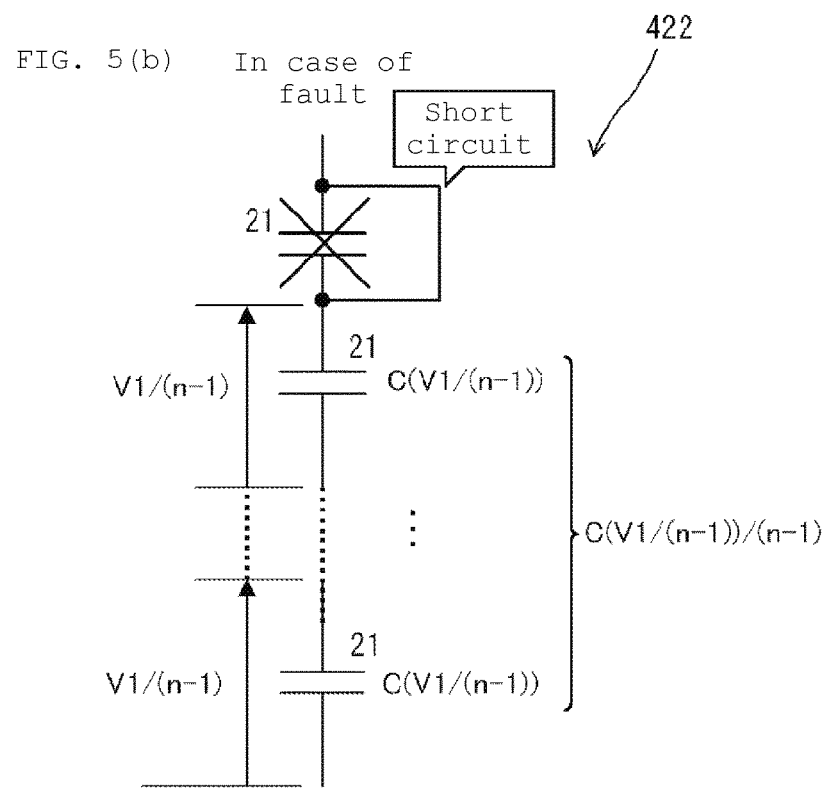

CAPACITOR CIRCUIT, CAPACITOR MODULE, AND POWER CONVERSION SYSTEM

CROSS REFERENCE TO RELATED APPLICATIONS

The present application is a continuation of PCT/JP2015/079482 filed Oct. 19, 2015, which claims priority to Japanese Patent Application No. 2014-258484, filed Dec. 22, 2014, the entire contents of each of which are incorporated herein by reference.

TECHNICAL FIELD

The present disclosure relates to a capacitor circuit, a capacitor module, and a power conversion system.

BACKGROUND

Conventionally, a power conversion system has been proposed in which a snubber circuit is connected between output terminals of a power supply circuit that supplies direct-current power to a power conversion circuit including a switching element, and a surge voltage generated in the power conversion circuit is absorbed by the snubber circuit, for example, as described in Patent Document 1 (identified below). In this power conversion system, a capacitor circuit in which two capacitors are connected in series is used as the snubber circuit. This makes it possible to prevent short circuit between the output terminals of the power supply circuit even if a short-circuit fault occurs in one of the capacitors connected in series, thereby preventing flow of a high current in the power conversion circuit. It is noted that, in this kind of power conversion system, a snubber circuit is sometimes connected, for example, in parallel with a capacitor for smoothing. A module integrating the capacitor for smoothing and the snubber circuit is sometimes referred to as a capacitor module.

Patent Document 1: Japanese Patent Application Laid-Open No. 2013-252009.

However, according to the configuration described in Patent Document 1, the electrostatic capacitance of the whole capacitor circuit changes upon occurrence of a short-circuit fault in one of the two capacitors in a case where, for example, low-dielectric-constant ceramic capacitors or film capacitors are used as the capacitors that constitute the capacitor circuit. This undesirably changes surge voltage absorption characteristics of the capacitor circuit.

SUMMARY

In view of the above-noted circumstances of existing designs, the present disclosure provides a capacitor circuit, a capacitor module, and a power conversion system that make it possible to suppress a fluctuation of electrostatic capacitance in case of a fault.

A capacitor circuit is disclosed that includes a plurality of ceramic capacitors that are connected in series, wherein the plurality of ceramic capacitors each have a ferroelectric layer interposed between electrodes and have substantially identical direct-current bias characteristics such that electrostatic capacitance during application of a first voltage is larger than electrostatic capacitance during application of a second voltage higher than the first voltage.

The capacitor circuit disclosed herein may be configured such that the first voltage is a voltage applied to each of the ceramic capacitors when a preset third voltage is applied to the capacitor circuit; the second voltage is a voltage applied to each of the ceramic capacitors when the third voltage is applied to the capacitor circuit in which any one of the ceramic capacitors has a short-circuit fault; and the direct-current bias characteristics of each of the ceramic capacitors are set so that electrostatic capacitance of the whole capacitor circuit in which all of the plurality of ceramic capacitors are normal and electrostatic capacitance of the whole capacitor circuit in which any one of the ceramic capacitors has a short-circuit fault are substantially identical to each other.

The capacitor circuit disclosed herein may be configured such that the number of ceramic capacitors is n, which is an integer of 2 or more; and the plurality of ceramic capacitors have direct-current bias characteristics such that the following relational expression (1) is established:

$$(1-\Delta) \times C(V1/n) \times (n-1)/n \leq C(V1/(n-1)) \leq (1+\Delta) \times C(V1/n) \times (n-1)/n \quad \text{expression (1)}$$

where V1 is the third voltage, $C(V1/n)$ is electrostatic capacitance during application of a voltage $V1/n$, $C(V1/(n-1))$ is electrostatic capacitance during application of a voltage $V1/(n-1)$, which is $n/(n-1)$ times as high as the voltage $V1/n$, and $\Delta$ is an allowable value.

The capacitor circuit disclosed herein may be configured such that the ferroelectric layers of the respective plurality of ceramic capacitors are made of an identical material.

The capacitor circuit according to the disclosure may further include resistors that are connected in parallel with the respective plurality of ceramic capacitors, wherein the plurality of resistors have a substantially identical resistance value.

A capacitor module according to an exemplary aspect described herein includes a film capacitor; and the capacitor circuit that is connected in parallel with the film capacitor.

A power conversion system according to an exemplary aspect described herein includes: the capacitor module that is connected between output terminals of a power supply; and a power conversion circuit that is connected between the output terminals of the power supply and converts a direct current into an alternating current or converts an alternating current into a direct current.

According to the present disclosure, when a short-circuit fault occurs in one of ceramic capacitors of a capacitor circuit, a voltage applied to the other one of the ceramic capacitors rises, and the electrostatic capacitance of the other one of the ceramic capacitors decreases. By thus decreasing the electrostatic capacitance of the individual ceramic capacitors, it is possible to suppress a fluctuation of the electrostatic capacitance of the whole capacitor circuit in case of a short-circuit fault of a ceramic capacitor.

BRIEF DESCRIPTION OF THE DRAWINGS

FIG. 2 is a cross-sectional view of a ceramic capacitor according to Embodiment 1.

FIG. 4(a) is an explanatory view for explaining operation of a capacitor circuit according to Embodiment 1 during a normal state, and FIG. 4(b) is an explanatory view for explaining operation of the capacitor circuit according to Embodiment 1 in case of a fault.

FIG. 5(a) is an explanatory view for explaining operation of a capacitor circuit according to Embodiment 2 during a normal state, and FIG. 5(b) is an explanatory view for explaining operation of the capacitor circuit according to Embodiment 2 in case of a fault.

DETAILED DESCRIPTION

Exemplary embodiments will be described in detail below with reference to the drawings.

Embodiment 1

Figure 1:
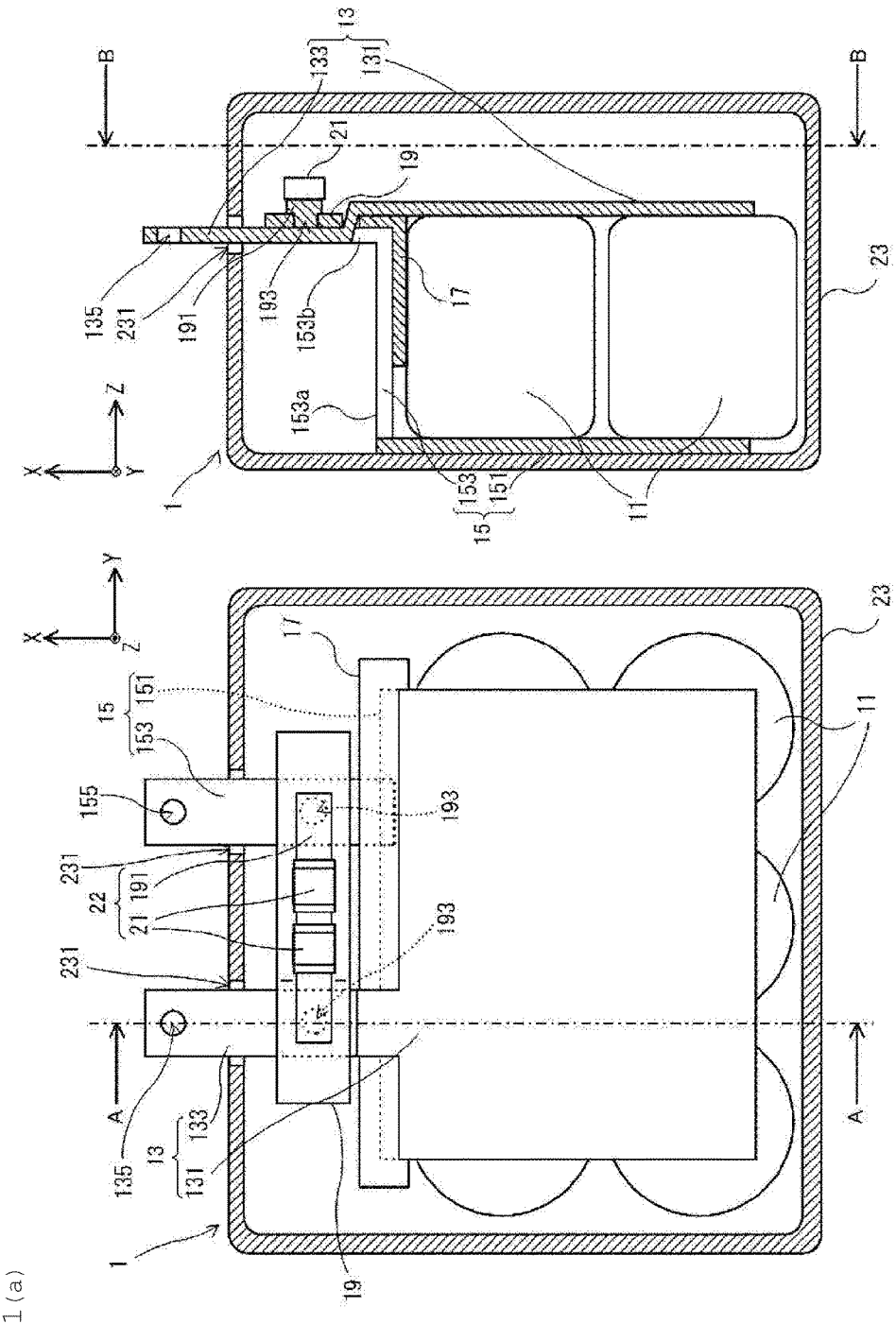
FIG. 1(a) is a cross-sectional view of a capacitor module according to Embodiment 1.
FIG. 1(b) is a cross-sectional view taken along line A-A of FIG. 1(a).

A capacitor module 1 according to the present embodiment includes a plurality of (six in FIG. 1) film capacitors 11, a positive electrode bus bar 13, a negative electrode bus bar 15, an insulating member 17, an insulating substrate 19, a capacitor circuit 22, and a housing 23, as illustrated in FIGS. 1(a) and 1(b). FIG. 1(a) is a cross-sectional view taken along line B-B of FIG. 1(b).

Each of the film capacitors 11 has an electrode at both ends thereof in a direction of an axis about which a plastic film is wound (Z direction in FIGS. 1(a) and 1(b)). The film capacitors 11 are molded by a mold material (not illustrated) that fills a space between the film capacitors 11 and the housing 23.

The positive electrode bus bar 13 and the negative electrode bus bar 15 connect the plurality of film capacitors 11 in parallel. The positive electrode bus bar 13 and the negative electrode bus bar 15 are, for example, made of a metal material such as aluminum or another conductive material.

The positive electrode bus bar 13 has a main piece 131 having a rectangular plate shape and a terminal piece 133 that has an elongated rectangular plate shape and extends from a point of a circumferential part of the main piece 131 in a direction orthogonal to the thickness direction of the main piece 131. The terminal piece 133 has a positive electrode connection hole 135 at an end thereof. The positive electrode connection hole 135 is a through-hole that passes through the terminal piece 133 in the thickness direction of the terminal piece 133. The main piece 131 is electrically connected to positive electrodes of all of the plurality of film capacitors 11. The positive electrode bus bar 13 is connected to another module by using the positive electrode connection hole 135.

The negative electrode bus bar 15 has a main piece 151 having a rectangular plate shape and a terminal piece 153 having a shape obtained by bending an elongated rectangular plate in an L-shape. The terminal piece 153 is made up of a first portion 153a that extends from a point of a circumferential part of the main piece 151 in a direction parallel with the thickness direction of the main piece 151, and a second portion 153b that extends from an end of the first portion 153a in a direction orthogonal to the thickness direction of the main piece 151, as illustrated in FIG. 1(b). The second portion 153b has a negative electrode connection hole 155 at an end thereof. The negative electrode connection hole 155 is a through-hole that passes through the second portion 153b in the thickness direction of the second portion 153b. The main piece 151 is electrically connected to negative electrodes of all of the plurality of film capacitors 11. The negative electrode bus bar 15 is connected to another module by using the negative electrode connection hole 155.

The insulating member 17 is interposed between the positive electrode bus bar 13 and the negative electrode bus bar 15 in a portion where the positive electrode bus bar 13 and the negative electrode bus bar 15 face each other, and thereby electrically insulates the positive electrode bus bar 13 and the negative electrode bus bar 15 from each other. The insulating member 17 is, for example, made of insulating paper obtained by stacking resin films such as polypropylene (PP) films. Note that the insulating member 17 is not limited to the aforementioned insulating paper.

On the insulating substrate 19, two ceramic capacitors 21 and a conductive pattern 191 are disposed. The insulating substrate 19 plays a role of increasing a creepage distance between (i) the ceramic capacitors 21 and the conductive pattern 191 and (ii) the positive electrode bus bar 13 and the negative electrode bus bar 15. The insulating substrate 19 is, for example, a glass epoxy substrate. The conductive pattern 191 is, for example, made of a metal material such as aluminum or another conductive material.

The capacitor circuit 22 is made up of the two ceramic capacitors 21 that are connected in series and the conductive pattern 191 that connects the ceramic capacitors 21 to the positive electrode bus bar 13 and the negative electrode bus bar 15. The two ceramic capacitors 21 have substantially identical direct current bias characteristics. The conductive pattern 191 has, at both ends thereof, a through-via 193 that passes through the insulating substrate 19 in the thickness direction. The conductive pattern 191 is electrically connected to the terminal piece 133 of the positive electrode bus bar 13 and the terminal piece 153 of the negative electrode bus bar 15 by using the through-via 193.

Each of the ceramic capacitors 21 is a so-called high-dielectric-constant multilayer ceramic capacitor having a ferroelectric layer made of a ferroelectric material as illustrated in FIG. 2. Each of the ceramic capacitors 21 includes a multilayer body 211 having a substantially rectangular parallelepiped shape in which a plurality of ferroelectric layers 212 and a plurality of conductive layers (electrodes) 213 are alternately stacked, and a pair of outer electrodes 214a and 214b that cover both ends of the multilayer body 211 in a direction (Y direction in FIG. 2) orthogonal to a stacking direction (Z direction in FIG. 2) of the multilayer body 211.

The multilayer body 211 is made up of an inner layer portion 211m, and a first outer layer portion 212b1 and a second outer layer portion 212b2 that are located on both sides, in the stacking direction, of the inner layer portion 211m.

The plurality of conductive layers 213 of the inner layer portion 211m include conductive layers 213A that are electrically connected to the outer electrode (e.g., positive electrode) 214a, and conductive layers 213B that are electrically connected to the outer electrode (e.g., negative electrode) 214b. The conductive layers 213A and the conductive layers 213B are disposed so that portions thereof overlap each other when viewed from the stacking direction of the multilayer body 211. Specifically, portions of the conductive layers 213A on the outer electrode 214b side (−Y direction side in FIG. 2) and portions of the conductive layers 213B on the outer electrode 214a side (+Y direction side in FIG. 2) overlap each other. In other words, ends of the conductive layers 213A protrude toward the +Y direction side relative to the conductive layers 213B, and ends of the conductive layers 213B protrude toward the −Y direction side relative to the conductive layers 213A. The plurality of ferroelectric layers 212 of the inner layer portion 211m have the same thickness. The ferroelectric layers 212 are, for example, made of a barium titanate series ceramic material. The conductive layers 213 are, for example, made of a metal material such as nickel or silver.

The first outer layer portion 212b1 and the second outer layer portion 212b2 are insulating layers that are located on both sides in the stacking direction of the inner layer portion 211m. In the example illustrated in FIG. 2, the first outer layer portion 212b1 and the second outer layer portion 212b2 are the ferroelectric layers 212.

Returning to FIG. 1, the housing 23 contains the film capacitors 11, the capacitor circuit 22, and the like. The housing 23 is, for example, made of a metal or a resin material having good heat radiation. The housing 23 has a substantially rectangular box shape and has, in a side wall thereof, through-holes 231 through which ends of the terminal pieces 133 and 153 of the positive electrode bus bar 13 and the negative electrode bus bar 15, respectively, protrude toward an outside of the housing 23.

Next, direct current bias characteristics of the ceramic capacitors 21 that constitute the capacitor circuit 22 according to the present embodiment will be described.

The characteristics of the ceramic capacitors 21 that constitute the capacitor circuit 22 are determined by a material of which the ferroelectric layers 212 included in the inner layer portion 211m are made, the thickness W1 (see FIG. 2) of each of the ferroelectric layers 212 included in the inner layer portion 211m, and the effective area of the conductive layers 213 included in the inner layer portion 211m. The effective area of the conductive layers 213 varies depending on the number of stacked conductive layers 213 and the area S1 (see FIG. 2) of the portion where the conductive layers 213A and the conductive layers 213B overlap each other. The direct current bias characteristics of the ceramic capacitors 21 are expressed by a characteristic curve that exhibits voltage dependence of electrostatic capacitance such that the electrostatic capacitance decreases as the voltage increases. Accordingly, the ceramic capacitors 21 using a ferroelectric material have larger electrostatic capacitance during application of a first voltage than during application of a second voltage higher than the first voltage. The slope of the characteristic curve depends on the material and the thickness W1 of the ferroelectric layers 212 included in the inner layer portion 211m. That is, a difference between electrostatic capacitance during application of a voltage V1 and electrostatic capacitance during application of a voltage V2 is determined by the material and the thickness W1 of the ferroelectric layers 212 included in the inner layer portion 211m. In a case where the slope of the characteristic curve is determined by determining the material of the ceramic capacitors 21 and the thickness of the ferroelectric layers 212 of the inner layer portion 211m, an absolute value of electrostatic capacitance expressed by the characteristic curve depends on the effective area of the conductive layers 213.

Figure 3:
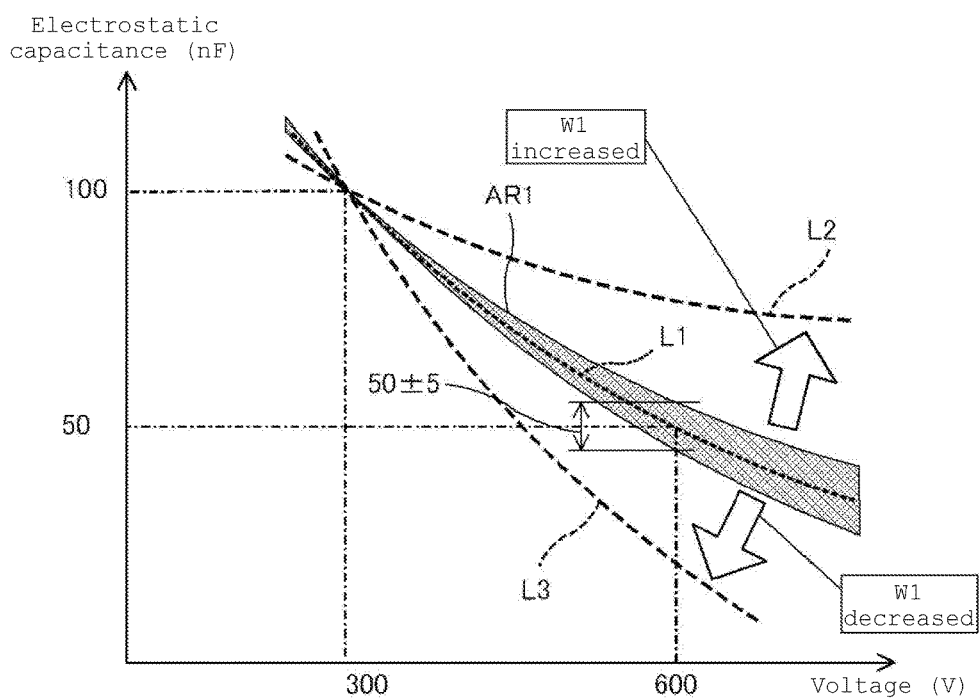
FIG. 3 illustrates direct current bias characteristics of the ceramic capacitor according to Embodiment 1.

FIG. 3 illustrates an example of such direct current bias characteristics of the ceramic capacitors 21. FIG. 3 illustrates a change of electrostatic capacitance relative to a voltage applied to a single ceramic capacitor 21. In the example expressed by a characteristic curve L1 of FIG. 3, a ceramic material mainly containing $BaTiO3-BaZrO_3$-Gd (composition ratio 100:9:12) is used as the material of which the ferroelectric layers 212 included in the inner layer portion 211m are made. Moreover, the thickness of each of the ferroelectric layers 212 included in the inner layer portion 211m is 40 μm. Furthermore, the number of ferroelectric layers 213 stacked in the inner layer portion 211m is 45, and the area S1 of the portion where the conductive layers 213A and the conductive layers 213B overlap each other is 10 mm². According to the direct current bias characteristics expressed by the characteristic curve L1 of FIG. 3, electrostatic capacitance during application of 300 V is 100 nF, and electrostatic capacitance during application of 600 V is 50 nF.

In a case where the thickness W1 of each of the ferroelectric layers 212 included in the inner layer portion 211m is increased, the slope of a characteristic curve (e.g., a characteristic curve L2 of FIG. 3) is smaller than that of the characteristic curve L1. Meanwhile, in a case where the thickness W1 of each of the ferroelectric layers 212 included in the inner layer portion 211m is decreased, the slope of a characteristic curve (e.g., a characteristic curve L3 of FIG. 3) is larger than that of the characteristic curve L1. That is, even in a case where the material of which the ferroelectric layers 212 included in the inner layer portion 211m is made is not changed, the direct current bias characteristics can be changed by changing the thickness of each of the ferroelectric layers 212. Note that, in the example illustrated in FIG. 3, not only the thickness of each of the ferroelectric layers 212, but also the effective area of the conductive layers 213 included in the inner layer portion 211m are changed so that the electrostatic capacitance during application of 300 V is 100 nF on all of the three characteristic curves L1, L2, and L3. In a case where the thickness of each of the ferroelectric layers 212 is increased, a difference between electrostatic capacitance during application of 300 V and electrostatic capacitance during application of 600 V is smaller than 50 nF, whereas in a case where the thickness of each of the ferroelectric layers 212 is decreased, a difference between electrostatic capacitance during application of 300 V and electrostatic capacitance during application of 600 V is larger than 50 nF.

Next, characteristics of the capacitor circuit 22 according to the present embodiment will be described.

Hereinafter, a voltage applied to each of the ceramic capacitors 21 when a rated voltage (third voltage) is applied to the capacitor circuit 22 is referred to as a first voltage. Hereinafter, a voltage applied to each of the ceramic capacitors 21 when the rated voltage is applied to the capacitor circuit (hereinafter referred to as a "faulty capacitor circuit") 22 in which any one of the ceramic capacitors 21 has a short-circuit fault is referred to as a second voltage. The "rated voltage" as used herein refers, for example, to a voltage preset, for example, by specification or the like of an electric circuit connected to the capacitor circuit 22.

In this case, when a rated voltage V1 is applied to the capacitor circuit 22, the first voltage is V1/2, as illustrated in FIG. 4(a). In this case, the electrostatic capacitance of each of the ceramic capacitors 21A and 21B is C(V1/2), and the electrostatic capacitance of the capacitor circuit 22 is C(V1/2)/2. Note that C(V) denotes electrostatic capacitance of the ceramic capacitors 21 during application of a voltage V. The same applies hereinafter.

When the ceramic capacitor 21A has a short-circuit fault, the second voltage applied to the ceramic capacitor 21B is a voltage V1, which is two times as high as that during a normal state, as illustrated in FIG. 4(b). In this case, the electrostatic capacitance of the ceramic capacitor 21B is C(V1).

When the rated voltage V1 is applied to the normal capacitor circuit 22, the electrostatic capacitance of the whole capacitor circuit 22 is C(V1/2)/2, as illustrated in FIG. 4(a). Meanwhile, when the rated voltage V1 is applied to the capacitor circuit 22 in which one of the ceramic capacitors 21 has a short-circuit fault, the electrostatic capacitance of the whole capacitor circuit 22 is C(V1).

Assume, as a capacitor circuit including two capacitors connected in series, a capacitor circuit in which electrostatic capacitance of each capacitor is constant irrespective of an applied voltage. In the case of this capacitor circuit, if a short-circuit fault occurs in any one of the capacitors, the electrostatic capacitance of the whole capacitor circuit fluctuates to a value two times as high as that during a normal state when there is no short-circuit fault. In contrast to this, the capacitor circuit 22 according to the present embodiment includes the ceramic capacitors 21 having direct current bias characteristics such that electrostatic capacitance decreases as a voltage increases. According to this configuration, when a voltage applied to the normal ceramic capacitor 21 rises as a result of a short-circuit fault of any one of the ceramic capacitors 21, the electrostatic capacitance of the ceramic capacitor 21 decreases. This makes it possible to suppress a rapid fluctuation of the electrostatic capacitance of the whole capacitor circuit 22.

Preferably, the direct current bias characteristics of the ceramic capacitors 21 are designed so that a relationship of C(V1/2)/2=C(V1) is established. That is, the direct current bias characteristics of the ceramic capacitors 21 are set so that the electrostatic capacitance of the whole normal capacitor circuit 22 and the electrostatic capacitance of the whole faulty capacitor circuit 22 are equal to each other. According to this design, the electrostatic capacitance of the whole capacitor circuit 22 does not change even when a short-circuit fault occurs in any one of the two ceramic capacitors 21 that constitute the capacitor circuit 22.

For example, it is assumed that the rated voltage applied to the capacitor circuit 22 is 600 V. In this case, the ceramic capacitors 21 having direct current bias characteristics expressed, for example, by the characteristic curve L1 of FIG. 3 may be used in the capacitor circuit 22. In the case of the ceramic capacitors 21 having the direct current bias characteristics expressed by the characteristic curve L1 of FIG. 3, C(300V)=100 nF and C(600V)=50 nF. Accordingly, a relationship of C(300V)×(1/2)=C(600V) is established. That is, the capacitor circuit 22 is designed so that the electrostatic capacitance of the whole capacitor circuit 22 does not change even when a short-circuit fault occurs in one of the ceramic capacitors 21.

However, in consideration of the influence of a manufacturing error and the like of the ceramic capacitors 21, it is difficult to manufacture or select the ceramic capacitors 21 in which the relationship of C(V1/2)/2=C(V1) is established. In view of this, in the capacitor circuit 22 according to the present embodiment, an allowable value $\Delta$ is set for a change rate of the electrostatic capacitance of the whole faulty capacitor circuit 22 relative to the electrostatic capacitance of the whole normal capacitor circuit 22. The ceramic capacitors 21 (21A and 21B) having direct current bias characteristics such that the following relational expression (A) is established between the electrostatic capacitance C(V1/2)/2 of the whole normal capacitor circuit 22 and the electrostatic capacitance C(V1) of the whole faulty capacitor circuit 22 are manufactured or selected:

$(1-\Delta) \times C(V1/2) \times (1/2) \leq C(V1) \leq (1+\Delta) \times C(V1/2) \times (1/2)$   expression (A)

This means that the ceramic capacitors 21 having direct current bias characteristics that can be expressed by a characteristic curve included in a region AR1 including the characteristic curve L1 (see FIG. 3) may be, for example, manufactured or selected. That is, each of the ceramic capacitors 21A and 21B need just be designed so as to have direct current bias characteristics such that electrostatic capacitance during application of 300 V is 100 nF and electrostatic capacitance during application of 600 V is 50±5 [nF]. In this case, $\Delta$ is set to 0.1 in the expression (A).

As described above, in the capacitor circuit 22 according to the present embodiment, electrostatic capacitance of a normal one of the ceramic capacitors 21 decreases when a short-circuit fault occurs in any one of the ceramic capacitors 21 that constitute the capacitor circuit 22 and thereby a voltage applied to the normal ceramic capacitor 21 that constitutes the capacitor circuit 22 rises. Since the electrostatic capacitance of the normal ceramic capacitor 21 decreases, a fluctuation of the electrostatic capacitance of the whole capacitor circuit 22 caused by occurrence of a short-circuit fault of one ceramic capacitor 21 is suppressed.

The ceramic capacitors 21 according to the present embodiment are manufactured or selected so as to have direct current bias characteristics such that electrostatic capacitance C(V1/2) during application of a voltage V1/2 and electrostatic capacitance C(V1) during application of a voltage V1 are substantially identical to each other on the basis of the electrostatic capacitance C(V1/2) and the electrostatic capacitance C(V1). The voltage V1/2 is a voltage applied to each of the ceramic capacitors 21 when the rated voltage V1 is applied to the capacitor circuit 22. The voltage V1 is a voltage applied to each of the ceramic capacitors 21 when the voltage V1 is applied to the capacitor circuit 22 in which one of the ceramic capacitors 21 has a short-circuit fault. This makes it possible to further suppress a fluctuation of the electrostatic capacitance of the whole capacitor circuit 22, for example, in case of a fault of one of the ceramic capacitors 21.

The direct current bias characteristics of the ceramic capacitors 21 are set so that the relational expression (A) is satisfied. This allows an absolute value of a change rate of the electrostatic capacitance of the whole capacitor circuit 22 to be within the preset allowable value $\Delta$ even in a case where a short-circuit fault occurs in any one of the two ceramic capacitors 21 that constitute the capacitor circuit 22. It is therefore possible to set the direct current bias characteristics of the ceramic capacitors 21 in consideration of a manufacturing error and the like.

The ferroelectric layers 212 that constitute the inner layer portion 211m in one of the two ceramic capacitors 21 according to the present embodiment are made of the same material as the ferroelectric layers 212 that constitute the inner layer portion 211m in the other one of the two ceramic capacitors 21. This makes it easier to design the ceramic capacitors 21 than in a case where different materials are used in the two ceramic capacitors 21.

The capacitor circuit 22 according to the present embodiment is constituted by the ceramic capacitors 21 that have relatively small equivalent series inductance and that can be reduced in size. This allows the capacitor circuit 22 to be disposed close to the positive electrode connection hole 135 and the negative electrode connection hole 155 of the terminal pieces 133 and 153 of the positive electrode bus bar 13 and the negative electrode bus bar 15, as illustrated in FIGS. 1(a) and 1(b). This makes it possible to shorten a distance between the capacitor circuit 22 and the positive electrode connection hole 135 and a distance between the capacitor circuit 22 and the negative electrode connection hole 155, thereby shortening a wiring length from the capacitor circuit 22 to the positive electrode connection hole 135 and a wiring length from the capacitor circuit 22 to the negative electrode connection hole 155. Since an inductance component resulting from the wiring between the capacitor circuit 22 and the positive electrode connection hole 135 and the wiring between the capacitor circuit 22 and the negative electrode connection hole 155 can be reduced, it is possible to reduce the influence of a noise component resulting from this inductance component on an electric circuit (not illustrated) connected to the capacitor module 1.

It is oted that it is assumed that film capacitors are used in the capacitor circuit 22 instead of the ceramic capacitors 21. In this case, since the film capacitors generally have larger equivalent series inductance than ceramic capacitors, a noise component resulting from the equivalent series inductance in the capacitor circuit may undesirably affect an electric circuit (not illustrated) connected to the capacitor module 1. Furthermore, in general, there is a limit to a reduction of the size of film capacitors as compared with ceramic capacitors. Accordingly, in a case of a capacitor circuit using film capacitors, it is difficult to dispose the capacitor circuit close to the positive electrode connection hole 135 and the negative electrode connection hole 155 connected to an electric circuit in the capacitor module 1, thereby making it difficult to shorten a wiring length from the capacitor circuit 22 to the positive electrode connection hole 135 and a wiring length from the capacitor circuit 22 to the negative electrode connection hole 155.

Furthermore, the whole capacitor module 1 according to the present embodiment can be reduced in size since the capacitor circuit 22 can be reduced in size.

Embodiment 2

A capacitor circuit 422 according to the present embodiment includes three or more ceramic capacitors 21 that have substantially identical direct current bias characteristics.

It is assumed that the capacitor circuit 422 is constituted by n (n is an integer of 3 or more) ceramic capacitors 21 that are connected in series, as illustrated in FIG. 5(a). In this case, a voltage V1/n (n is an integer of 3 or more) is applied to each of the ceramic capacitors 21 when a rated voltage V1 is applied to the capacitor circuit 422.

Assume here that a short-circuit fault occurs in one of the n ceramic capacitors 21 that are included in the capacitor circuit 422 as illustrated in FIG. 5(b). In this case, a voltage V1/(n−1), which is n/(n−1) times as high as a voltage applied during a normal state, is applied to the other ceramic capacitors 21 included in the capacitor circuit 422. Accordingly, electrostatic capacitance of the whole normal capacitor circuit 422 is C(V1/n)/n, and electrostatic capacitance of the whole faulty capacitor circuit 422 is C(V1/(n−1))/(n−1). The ceramic capacitors 21 of the capacitor circuit 422 have direct current bias characteristics such that a relationship of C(V1/n)/n=C(V1/(n−1))/(n−1) is established between the electrostatic capacitance C(V1/n)/n of the whole normal capacitor circuit 422 and the electrostatic capacitance C(V1/(n−1))/(n−1) of the whole faulty capacitor circuit 422. Accordingly, the electrostatic capacitance of the whole capacitor circuit 422 does not change even when a short-circuit fault occurs in any one of the ceramic capacitors 21 (21A and 21B).

For example, it is assumed that the capacitor circuit 422 includes three ceramic capacitors 21. Furthermore, it is assumed that a rated voltage of 900 V is applied to the capacitor circuit 422. In this case, since the ceramic capacitors 21 that constitute the capacitor circuit 422 have identical characteristics, a voltage of 300 V is applied to each of the ceramic capacitors 21. Thus, when a short-circuit fault occurs in one of the ceramic capacitors 21, a voltage of 450 V is applied to each of the two normal ceramic capacitors 21. Accordingly, the electrostatic capacitance of the whole normal capacitor circuit 422 is C(300V)/3, and the electrostatic capacitance of the whole faulty capacitor circuit 422 is C(450V)/2. The electrostatic capacitance of the whole capacitor circuit 422 does not change even upon occurrence of a short-circuit fault in any one of the ceramic capacitors 21 when the ceramic capacitors 21 have direct current bias characteristics such that C(300V)/3=C(450)/2 is established between the electrostatic capacitance C(300V)/3 of the whole normal capacitor circuit 422 and the electrostatic capacitance C(450V)/2 of the whole faulty capacitor circuit 422.

Figure 6:
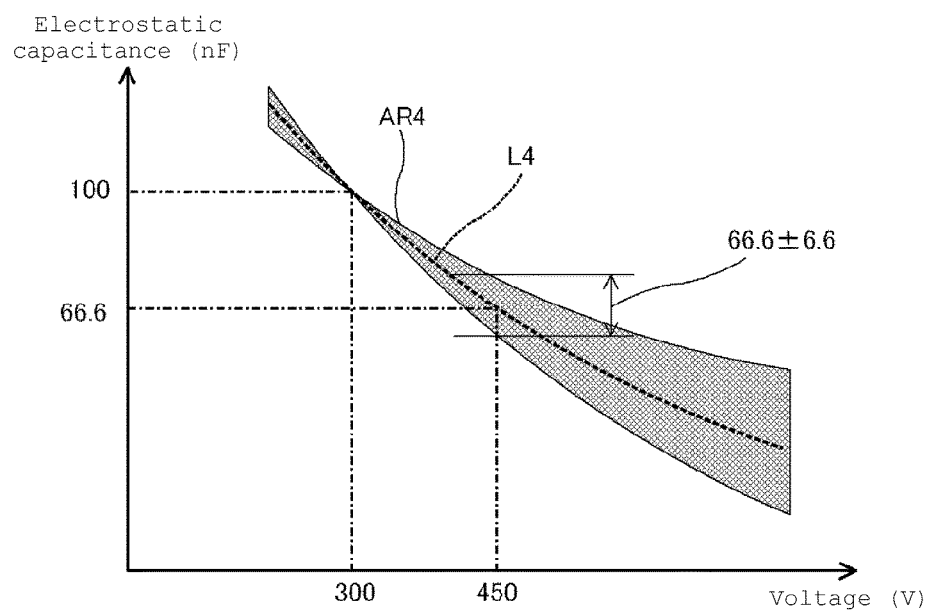
FIG. 6 illustrates direct current bias characteristics of a ceramic capacitor according to Embodiment 2.

For example, when the ceramic capacitors 21 have direct current bias characteristics expressed by a characteristic curve L4 of FIG. 6, C(300V)=100 nF and C(450V)=66.6 nF. Accordingly, a relationship of C(300V)×(1/3)=C(600V)×(1/2) is established. That is, the capacitor circuit 422 is designed so that the electrostatic capacitance of the whole capacitor circuit 422 does not change even when a short-circuit fault occurs in one of the ceramic capacitors 21.

It is noted that, in the ceramic capacitors 21 having direct current bias characteristics expressed by the characteristic curve L4 of FIG. 6, ferroelectric layers 212 included in an inner layer portion 211m (see FIG. 2) are made of a ceramic material mainly containing $BaTiO_3$-$BaZrO_3$-Gd (composition ratio 100:9:12). The thickness W1 (see FIG. 2) of each of the ferroelectric layers 212 included in the inner layer portion 211m is 40 μm. The number of ferroelectric layers 213 stacked in the inner layer portion 211m is 45 (see FIG. 2), and the area S1 (see FIG. 2) of a portion where conductive layers 213A and conductive layers 213B overlap each other is 10 $mm^2$.

However, in consideration of the influence of a manufacturing error and the like of the ceramic capacitors 21, it is difficult to manufacture or select the ceramic capacitors 21 in which the relationship of C(V1/n)/n=C(V1/(n−1))/(n−1) is established, as described in Embodiment 1. In view of this, in the capacitor circuit 422 according to the present embodiment, an allowable value Δ is set for a change rate of the electrostatic capacitance of the whole faulty capacitor circuit 422 relative to the electrostatic capacitance of the whole normal capacitor circuit 422. The ceramic capacitors 21 (21A and 21B) having direct current bias characteristics such that the following relational expression (B) is established between the electrostatic capacitance C(V1/n)/n of the whole normal capacitor circuit 422 and the electrostatic capacitance C(V1/(n−1))/(n−1) of the whole faulty capacitor circuit 422 are manufactured or selected:

$$(1-\Delta) \times C(V1/n) \times (n-1)/n \leq C(V1/(n-1)) \leq (1+\Delta) \times C(V1/n) \times (n-1)/n \qquad \text{expression } (B)$$

This means that the ceramic capacitors 21 having direct current bias characteristics that can be expressed by a characteristic curve included in a region AR4 including the characteristic curve L4 (see FIG. 6) may be, for example, manufactured or selected. That is, each of the ceramic capacitors 21 need just be designed so as to have direct current bias characteristics such that electrostatic capacitance during application of a voltage of 300 V is 100 nF and electrostatic capacitance during application of a voltage of 450 V is 66.6±6.6 [nF]. In this case, Δ is set to 0.1 in the expression (B).

According to this configuration, effects identical to those produced by the configuration described in Embodiment 1 are produced. Furthermore, according to this configuration, it is possible to reduce the frequency of short-circuit between both terminals of the capacitor circuit 422 as compared with a capacitor circuit constituted by two ceramic capacitors 21 that constitute the capacitor circuit 422.

Embodiment 3

Next, a power conversion system including a capacitor module 1 according to the present embodiment will be described.

Figure 7:
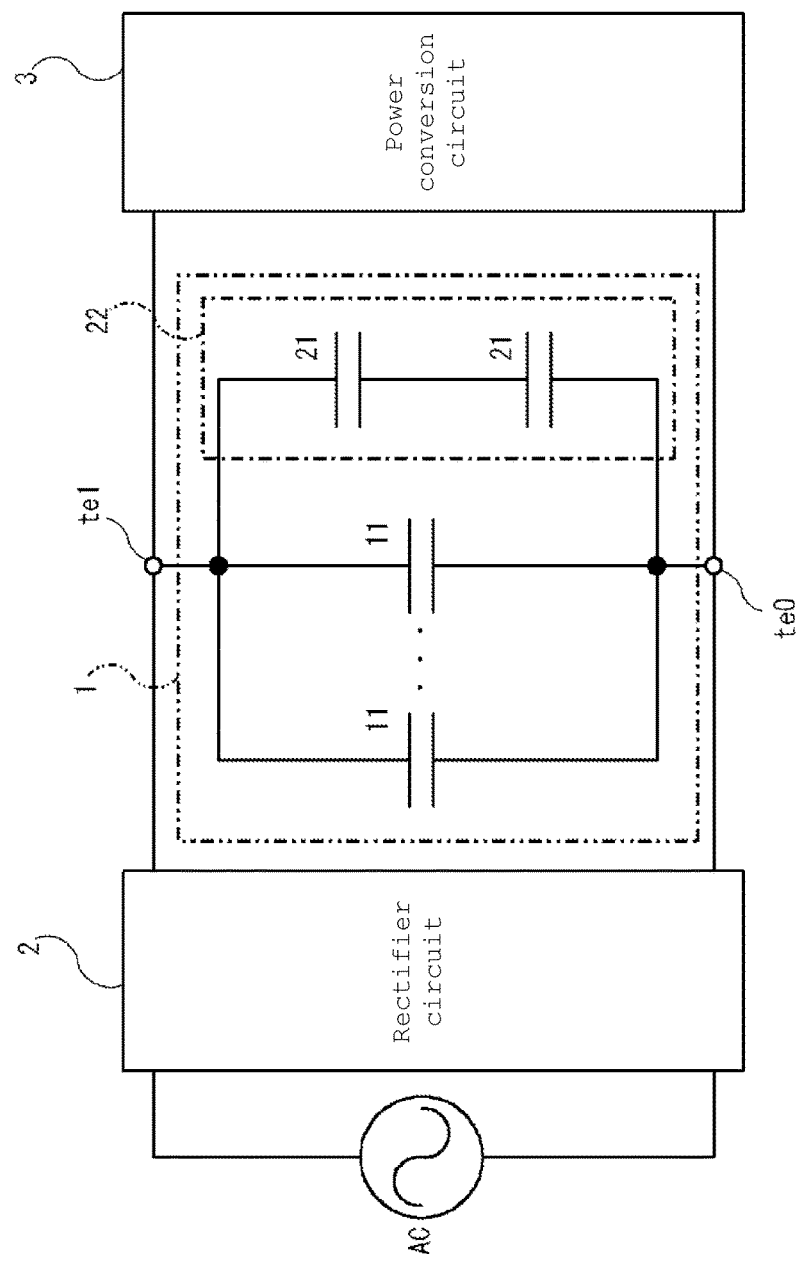
FIG. 7 is a circuit diagram of a power conversion system including a capacitor module according to Embodiment 3.

As illustrated in FIG. 7, the power conversion system includes a rectifier circuit 2 that is connected to an alternating-current power supply AC, a capacitor module 1 that is connected between output terminals te0 and te1 of the rectifier circuit 2, and a power conversion circuit 3 that is connected between the output terminals te0 and te1 of the rectifier circuit 2. The capacitor module 1 is identical to that described in Embodiment 1. The alternating-current power supply AC and the rectifier circuit 2 constitute a power supply that outputs a pulsating current obtained by rectifying an alternating current.

The rectifier circuit 2 is, for example, a full-wave rectifier circuit or a half-wave rectifier circuit using a diode and generates a pulsating current by rectifying an alternating current supplied from the alternating-current power supply AC. The pulsating current generated by the rectifier circuit 2 is smoothed by film capacitors 11 of the capacitor module 1. The power conversion circuit 3 is, for example, constituted by six switching elements and constitutes an inverter circuit that converts a direct current supplied from the rectifier circuit 2 side into a three-phase alternating current.

In this power conversion system, a surge voltage generated in the power conversion circuit 3 is absorbed by the capacitor circuit 22. Surge voltage absorption characteristics depend on the electrostatic capacitance of the capacitor circuit 22. The waveform of the surge voltage generated in the power conversion circuit 3 depends on a circuit configuration and the like of the power conversion system, and the electrostatic capacitance of the capacitor circuit 22 is designed so that surge voltage absorption characteristics according to the circuit configuration and the like of the power conversion system are realized.

In the power conversion system according to the present embodiment, the capacitor module 1 described in Embodiment 1 is used. Thanks to this, the electrostatic capacitance of the capacitor circuit 22 hardly changes and surge voltage absorption characteristics thereof hardly change even when a short-circuit fault occurs in any one of the two ceramic capacitors 21 that constitute the capacitor circuit 22. It is therefore possible to maintain surge voltage absorption characteristics according to the circuit configuration of the power conversion system even when a short-circuit fault occurs in any one of the two capacitor circuits 21 that constitute the capacitor circuit 22.

The exemplary embodiments have been described above, but the present invention is not limited to the above embodiments.

Figure 8:
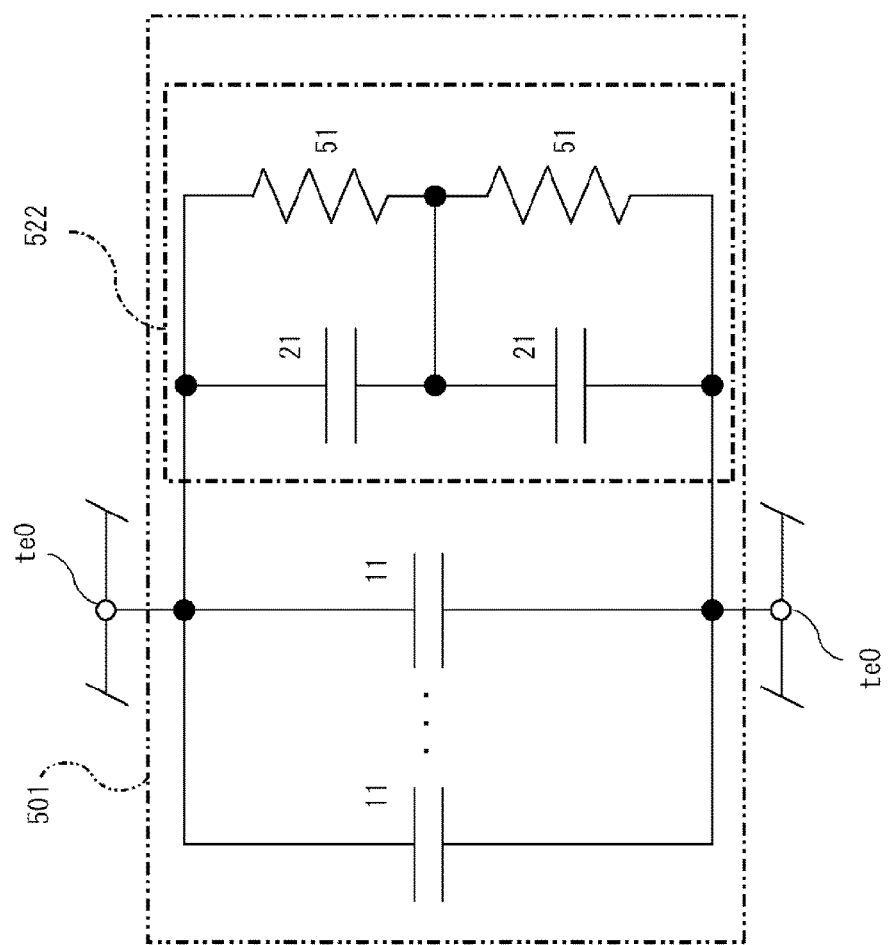
FIG. 8 is a circuit diagram of a capacitor module according to a modification.

In Embodiment 1, the capacitor circuit 22 constituted only by the ceramic capacitors 21 that are connected in series has been described. However, circuit elements included in the capacitor circuit 22 are not limited to ceramic capacitors. For example, a capacitor circuit 522 illustrated in FIG. 8 may include two ceramic capacitors 21 that are connected in series and resistive elements 51 for voltage dividing that are connected in parallel with the respective ceramic capacitors 21. The resistance value of each of the resistive elements 51 can be, for example, set to 1 MΩ.

According to this configuration, it is possible to suppress variation in voltages applied to the ceramic capacitors 21 that constitute the capacitor circuit 522 by appropriately setting the resistance value of each of the resistive element 51. It is therefore possible to stabilize the electrostatic capacitance of each of the ceramic capacitors 21. Furthermore, this configuration has an advantage of being easy to design the electrostatic capacitance of the whole capacitor circuit 522.

In Embodiments 1 and 2, an example in which the capacitor circuit 22 or 422 includes only one series circuit in which two or more ceramic capacitors 21 are connected in series has been described. However, the configuration of the capacitor circuit is not limited to this. For example, a plurality of series circuits each including two or more ceramic capacitors 21 connected in series may be connected in parallel. In the modification described with reference to FIG. 8, the capacitor circuit 522 that includes only one circuit including two ceramic capacitors 21 that are connected in series and resistive elements 51 for voltage dividing that are connected in parallel with the respective ceramic capacitors 21 has been described. However, for example, a plurality of circuits each including ceramic capacitors and the resistive elements 51 may be connected in parallel.

According to this configuration, it is possible to easily increase the electrostatic capacitance of the capacitor circuit just by increasing the number of capacitor series circuits included in the capacitor circuit that are connected in parallel.

In Embodiments 1 and 2, an example in which the ferroelectric layers 212 of the ceramic capacitors 21 are made of $BaTiO_3$-$BaZrO_3$-Gd (composition ratio 100:9:12) has been described. However, a material of which the ferroelectric layers 212 are made is not limited to this. For example, $BaTiO_3$-$CaTiO_3$ may be used as the material of which the ferroelectric layers 212 are made.

In Embodiment 1, the capacitor module 1 including the film capacitors 11 has been described. However, a capacitor module that includes a different kind of capacitors (e.g., electrolytic capacitors) instead of the film capacitors 11 may be used.

In Embodiment 1, an example in which the first outer layer portion 212b1 and the second outer layer portion 212b2 are the ferroelectric layers 212 made of a ferroelectric material has been described. However, a material of which the first outer layer portion 212b1 and the second outer layer portion 212b2 are made is not limited to a ferroelectric material. For example, the first outer layer portion 212b1 and the second outer layer portion 212b2 may be made of a dielectric material.

In Embodiment 3, the power conversion system in which the capacitor module 1 and the power conversion circuit 3 are connected to the power supply constituted by the alternating-current power supply AC and the rectifier circuit 2 has been described. However, the configuration of the power conversion system is not limited to this. For example, the power conversion system may be, for example, one in which the capacitor module 1 is connected to a power supply including a DC-DC converter.

Alternatively, the power conversion system may be a power conditioner that includes the capacitor module 1, a system power supply, a secondary battery, and a bidirectional inverter connected between the system power supply and the secondary battery. In this case, the capacitor module 1 is connected to a system power supply (power supply) side or a secondary battery side of the bidirectional inverter. In a case where the capacitor module 1 is connected to the secondary battery side of the bidirectional inverter, the secondary battery serves as a power supply that outputs a direct-current voltage. In this case, the capacitor module 1 can play a role of reducing a ripple current generated by operation of the bidirectional inverter.

The embodiments and modifications of the present invention (including the descriptions starting from "it is noted that"; the same applies hereinafter) have been described above, but the present invention is not limited to these. The present invention encompasses appropriate combinations of the embodiments and modifications and appropriate changes thereof.

DESCRIPTION OF REFERENCE SYMBOLS

1: capacitor module
11: film capacitor
13: positive electrode bus bar
15: negative electrode bus bar
17: insulating material
19: insulating substrate
21: ceramic capacitor
22, 422, 522: capacitor circuit
23: housing
131, 151: main piece
133, 153: terminal piece
135: positive electrode connection hole
155: negative electrode connection hole
191: conductive pattern
193: through-via

The invention claimed is:

1. A capacitor circuit comprising:
a plurality of ceramic capacitors that are connected in series, each of the plurality of ceramic capacitors including:
a plurality of electrodes, and
at least one ferroelectric layer respectively interposed between a pair of the plurality of electrodes,
wherein the plurality of ceramic capacitors have substantially identical direct-current bias characteristics such that an electrostatic capacitance of the capacitor circuit during application of a first voltage is larger than the electrostatic capacitance during application of a second voltage higher than the first voltage.

2. The capacitor circuit according to claim 1, wherein the first voltage is applied to each of the plurality of ceramic capacitors when a preset third voltage is applied to the capacitor circuit; and
the second voltage is applied to each of the plurality of ceramic capacitors when the third voltage is applied to the capacitor circuit and any one of the plurality of ceramic capacitors has a short-circuit fault.

3. The capacitor circuit according to claim 2, wherein the direct-current bias characteristics of each of the plurality of ceramic capacitors are set so that the electrostatic capacitance of the capacitor circuit in which all of the plurality of ceramic capacitors are in a normal operating state and the electrostatic capacitance of the capacitor circuit in which any one of the ceramic capacitors has a short-circuit fault are substantially identical to each other.

4. The capacitor circuit according to claim 1, wherein the direct-current bias characteristics of each of the plurality of ceramic capacitors are set so that the electrostatic capacitance of the capacitor circuit in which all of the plurality of ceramic capacitors are in a normal operating state and the electrostatic capacitance of the capacitor circuit in which any one of the ceramic capacitors has a short-circuit fault are substantially identical to each other.

5. The capacitor circuit according to claim 3, wherein the plurality of ceramic capacitors is a number of n ceramic capacitors, with n being an integer of 2 or more, and
wherein the plurality of ceramic capacitors have direct-current bias characteristics such that the following equation is satisfied:

$$(1-\Delta) \times C(V1/n) \times (n-1)/n \leq C(V1/(n-1)) \leq (1+\Delta) \times C(V1/n) \times (n-1)/n,$$

wherein V1 is the third voltage, $C(V1/n)$ is the electrostatic capacitance during application of a voltage $V1/n$, $C(V1/(n-1))$ is the electrostatic capacitance during application of a voltage $V1/(n-1)$, which is $n/(n-1)$ times as high as the voltage $V1/n$, and $\Delta$ is an allowable value.

6. The capacitor circuit according to claim 1, wherein the at least one ferroelectric layer comprises a plurality of ferroelectric layers each interposed, respectively, between a pair of the plurality of electrodes, wherein the plurality of ferroelectric layers being made of an identical material to each other.

7. The capacitor circuit according to claim 1, further comprising a plurality of resistors that are connected in parallel with the respective plurality of ceramic capacitors.

8. The capacitor circuit according to claim 7, wherein the plurality of resistors have a substantially identical resistance value to one another.

9. The capacitor circuit according to claim 1, wherein each of the plurality of ceramic capacitors includes a pair of opposing outer electrodes, with at least a first pair of the plurality of electrodes coupled to a first of the outer electrodes and extending towards a second of the outer electrodes, and at least a second pair of the plurality of electrodes coupled to the second outer electrode and extending towards the first outer electrode.

10. The capacitor circuit according to claim 9, wherein the at least first pair of the plurality of electrodes and the at least second pair of the plurality of electrodes overlap to each other when viewed from a stacking direction of the respective ceramic capacitor, such than an area of the overlap causes the plurality of ceramic capacitors to have the substantially identical direct-current bias characteristics.

11. The capacitor circuit according to claim 10, wherein the area of the overlap is 10 mm$^2$.

12. The capacitor circuit according to claim 10, wherein each of the at least one ferroelectric layer interposed between each pair of the plurality of electrodes has a thickness of 40 µm.

13. A capacitor module comprising:
a film capacitor; and
a capacitor circuit that is connected in parallel with the film capacitor, the capacitor circuit comprising:
a plurality of ceramic capacitors that are connected in series, each of the plurality of ceramic capacitors including:
a plurality of electrodes, and
at least one ferroelectric layer respectively interposed between a pair of the plurality of electrodes,
wherein the plurality of ceramic capacitors have substantially identical direct-current bias characteristics such that an electrostatic capacitance of the capacitor circuit during application of a first voltage is larger than the electrostatic capacitance during application of a second voltage higher than the first voltage.

14. The capacitor module according to claim 13, wherein
the first voltage is applied to each of the plurality of ceramic capacitors when a preset third voltage is applied to the capacitor circuit; and
the second voltage is applied to each of the plurality of ceramic capacitors when the third voltage is applied to the capacitor circuit and any one of the plurality of ceramic capacitors has a short-circuit fault.

15. The capacitor module according to claim 14, wherein the direct-current bias characteristics of each of the plurality of ceramic capacitors are set so that the electrostatic capacitance of the capacitor circuit in which all of the plurality of ceramic capacitors are in a normal operating state and the electrostatic capacitance of the capacitor circuit in which any one of the ceramic capacitors has a short-circuit fault are substantially identical to each other.

16. The capacitor module according to claim 15,
wherein the plurality of ceramic capacitors is a number of n ceramic capacitors, with n being an integer of 2 or more, and
wherein the plurality of ceramic capacitors have direct-current bias characteristics such that the following equation is satisfied:

$$(1-\Delta) \times C(V1/n) \times (n-1)/n \leq C(V1/(n-1)) \leq (1+\Delta) \times C(V1/n) \times (n-1)/n,$$

wherein V1 is the third voltage, C(V1/n) is the electrostatic capacitance during application of a voltage V1/n, C(V1/(n−1)) is the electrostatic capacitance during application of a voltage V1/(n−1), which is n/(n−1) times as high as the voltage V1/n, and $\Delta$ is an allowable value.

17. A power conversion system comprising:
a capacitor module that is connected between output terminals of a power supply, the capacitor module including:
a film capacitor; and
a capacitor circuit that is connected in parallel with the film capacitor, the capacitor circuit comprising:
a plurality of ceramic capacitors that are connected in series, each of the plurality of ceramic capacitors including:
a plurality of electrodes, and
at least one ferroelectric layer respectively interposed between a pair of the plurality of electrodes,
wherein the plurality of ceramic capacitors have substantially identical direct-current bias characteristics such that an electrostatic capacitance of the capacitor circuit during application of a first voltage is larger than the electrostatic capacitance during application of a second voltage higher than the first voltage; and
a power conversion circuit that is connected between the output terminals of the power supply and converts a direct current into an alternating current or converts an alternating current into a direct current.

18. The power conversion system according to claim 17, wherein
the first voltage is applied to each of the plurality of ceramic capacitors when a preset third voltage is applied to the capacitor circuit; and
the second voltage is applied to each of the plurality of ceramic capacitors when the third voltage is applied to the capacitor circuit and any one of the plurality of ceramic capacitors has a short-circuit fault.

19. The power conversion system according to claim 18, wherein the direct-current bias characteristics of each of the plurality of ceramic capacitors are set so that the electrostatic capacitance of the capacitor circuit in which all of the plurality of ceramic capacitors are in a normal operating state and the electrostatic capacitance of the capacitor circuit in which any one of the ceramic capacitors has a short-circuit fault are substantially identical to each other.

20. The power conversion system according to claim 19,
wherein the plurality of ceramic capacitors is a number of n ceramic capacitors, with n being an integer of 2 or more, and
wherein the plurality of ceramic capacitors have direct-current bias characteristics such that the following equation is satisfied:

$$(1-\Delta) \times C(V1/n) \times (n-1)/n \leq C(V1/(n-1)) \leq (1+\Delta) \times C(V1/n) \times (n-1)/n,$$

wherein V1 is the third voltage, C(V1/n) is the electrostatic capacitance during application of a voltage V1/n, C(V1/(n−1)) is the electrostatic capacitance during application of a voltage V1/(n−1), which is n/(n−1) times as high as the voltage V1/n, and $\Delta$ is an allowable value.

* * * * *